Figure 1:
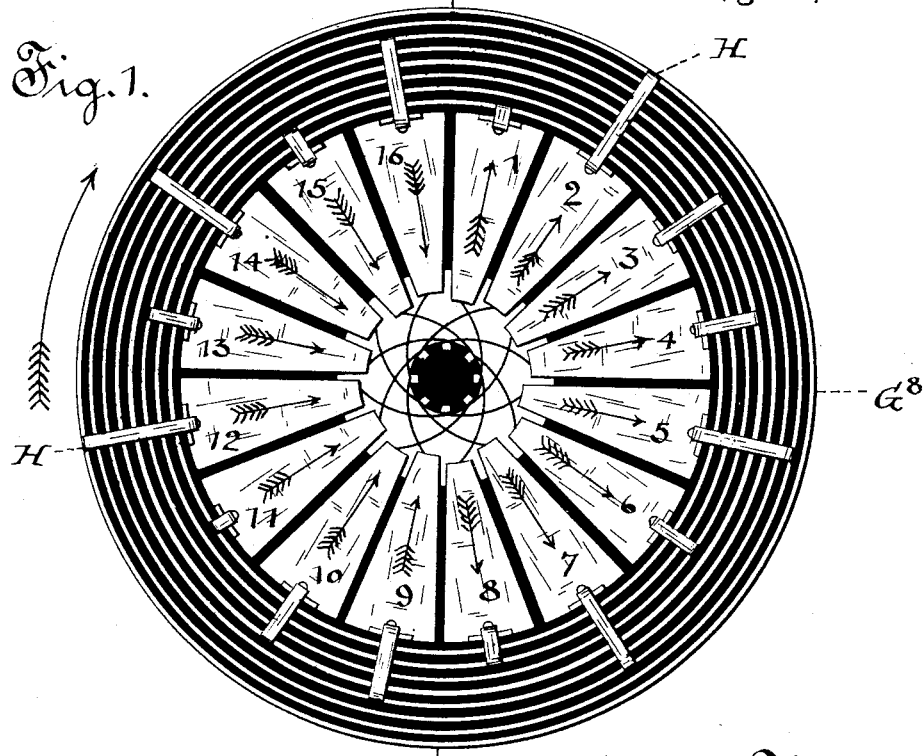

(No Model.)  2 Sheets—Sheet 1.

T. A. EDISON.
MAGNETO OR DYNAMO ELECTRIC MACHINE.

No. 263,150. Patented Aug. 22, 1882.

ATTEST:
D. D. Mott
M. J. Bagett per.

INVENTOR:
T. A. Edison
Dyer & Wilber
Attys.

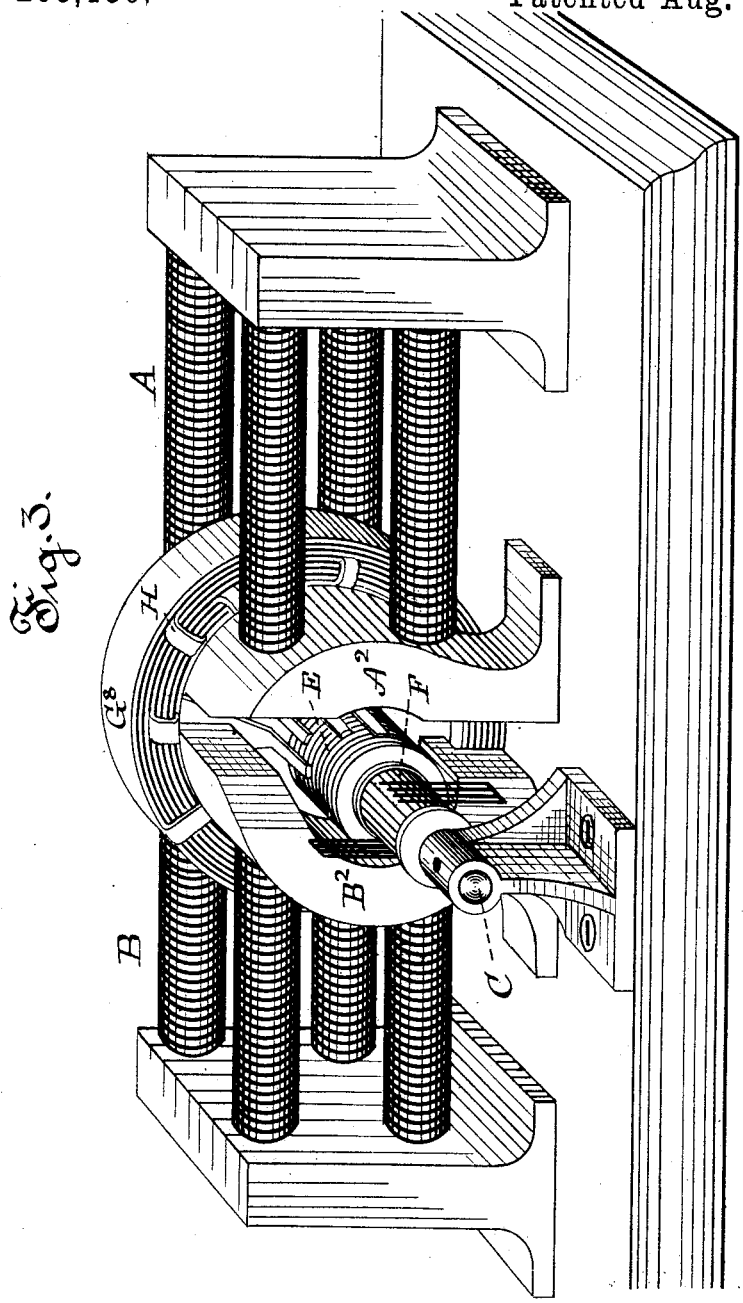

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MAGNETO OR DYNAMO ELECTRIC MACHINE.

SPECIFICATION forming part of Letters Patent No. 263,150, dated August 22, 1882.

Application filed June 22, 1881. (No model.)

*To all whom it may concern:*

Be it known that I, THOMAS A. EDISON, of Menlo Park, in the county of Middlesex and State of New Jersey, have invented a new and useful Improvement in Magneto or Dynamo Electric Machines or Electric Engines, (Case No. 331;) and I do hereby declare that the following is a full and exact description of the same, reference being had to the accompanying drawings, and to the letters of reference marked thereon.

The object I have in view is to produce a dynamo or magneto electric machine in which the iron core of the armature will not be necessary and the loss of power caused by the heating of the same will be avoided, only the inductive portion of the armature being passed between the poles of the exciting magnet or magnets, which poles can consequently be brought close together, so as to produce an intense magnetic field; and my object is, further, to construct a machine of this character so that it will generate a continuous current of high electro-motive force in the same direction without the use of pole-changers. All the inductive portions of the armature will be constantly in circuit, and the internal resistance of the machine will be exceedingly small.

I accomplish this object by constructing the armature in the shape of a disk or plate like that used by Arago in his experiments, but divided into radial sections. These radial sections, which form the inductive portion of the armature, are preferably naked copper bars connected together by insulating material and attached rigidly to the driving-shaft by an insulating-hub. At their inner ends these bars are connected in pairs, preferably by means of metal plates insulated from each other, which plates have tongues secured in the grooves of an insulating commutator-cylinder. The radial bars revolve between the polar extensions of a magnet or magnets, (two magnets being preferred for this purpose,) and outside of such polar extensions the disk formed of radial bars and insulating material is surrounded by concentric metal rings, which are insulated from each other and the radial bars, except as hereinafter explained. The number of the rings is one-half that of the radial bars. The pairs of bars are connected in multiple arc at their outer ends by these concentric rings, straps, bands, or rods being used for this purpose, said straps, bands, or rods extending from the bars to the rings, and being insulated from all the rings except the ones they are intended to connect with the bars. Instead of using separate bands, straps, or rods to connect the bars with the rings, such bars can be forked and extend up on each side of the rings, the proper rings being extended to make connection with the bars. This construction is stronger than that before described, and offers less resistance to the passage of the current. The rings connect the bars in such manner that the connections are symmetrical at every position of the machine. The rings are complete, and extend in both directions from and to the connecting bands, straps, or rods, so that the plates are connected in multiple arc, half the current passing in each direction. This makes a more symmetrical and stronger construction than if partial rings were used, and the resistance is less. The current, commencing at the negative commutator brush or spring, is divided into two parts, each of which parts passes through one-half of the radial bars and combines with the other part at the positive commutator brush or spring. In this manner all the bars are continually kept in circuit and a current is generated having an electro-motive force due to one-half the length of all the plates. The concentric rings are arranged outside of the polar extensions so that such extensions can be brought close up to the inductive bars, while the rings are nearly outside of the magnetic field, and do not cut the lines of force at right angles, and consequently have no counter effect upon the electro-motive force of the current. The plates connecting the radial bars with the commutator, the concentric rings, the connecting bands, straps, or rods, and the radial bars themselves, all having large conducting area, the internal resistance of the machine will be exceedingly small. The radial bars could be cut away at three or more points to make room for metallic arms, in order to strengthen the armature, without seriously detracting from the efficiency of the machine.

The novel features of this machine are equally well applicable to electric engines and motors, and this description is intended by me to be understood as covering the same. As an engine or motor the construction would have the advantage of great lateral compactness, enabling me to use the engine on a narrow railway-car without projecting over the sides of the same, or in other locations where space is limited.

Figure 2:
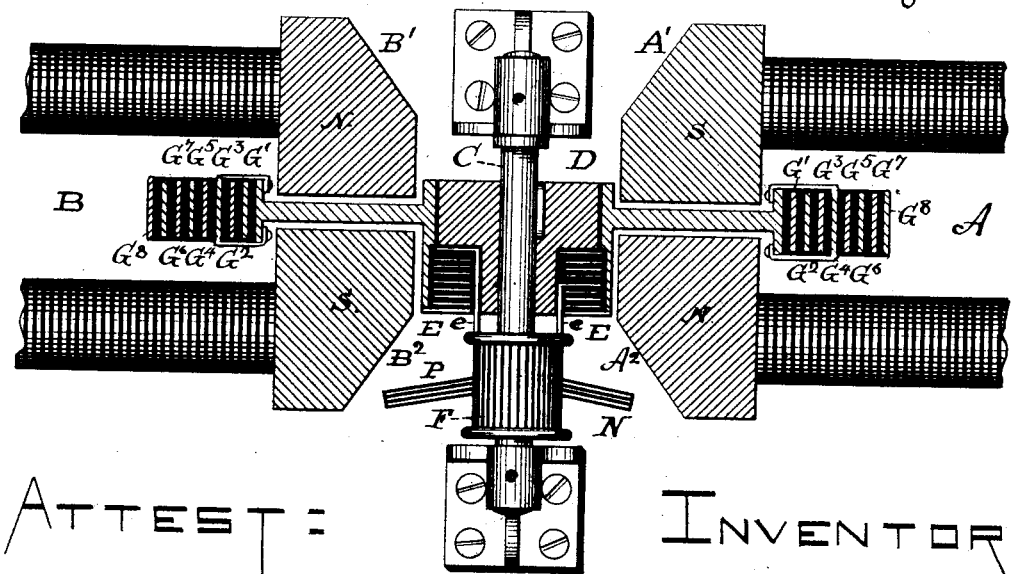

In the drawings, Figure 1 is an elevation of the revolving armature with the commutator in section, the connections of the radial bars with the commutator being shown diagrammatically; Fig. 2, a central horizontal section of the machine, and Fig. 3 a perspective view of the machine.

Like letters denote corresponding in all three figures.

$A'$ $A^2$ and $B'$ $B^2$ are the polar extensions of the electro-magnets A B, which are preferably arranged, as shown, on opposite sides of the driving-shaft C.

The radial naked copper bars, which are numbered 1 to 16, inclusive, are mounted upon a hub, D, secured to the shaft and properly insulated from such shaft. Sixteen radial bars are shown for purposes of illustration; but the number might be more or less, according to the size of the machine. These bars are joined edgewise by a non-conducting material, so that they form a rigid disk or plate. The radial bars are turned outwardly at their lower ends and connected thereby, or by rods, with plates E, which are insulated from each other and have tongues $e$, two of which are shown in Fig. 2, extending outwardly and forming the conducting portions of the commutator-cylinder F.

Two radial bars are connected with each plate E, and by it connected with the nearest central commutator-bar. In the arrangement shown the pairs 1 and 8, 2 and 11, 3 and 10, 4 and 13, 5 and 12, 6 and 15, 7 and 14, 9 and 16 are connected together and to central commutator-bars. The concentric rings $G'$ to $G^8$, inclusive, surround the disk formed by the radial bars, outside of the polar extensions $A'$ $A^2$ $B'$ $B^2$, and are separated from such disks and one another by a suitable insulating material. The radial bars are connected in couples by these rings, bands, straps, or rods H being used for that purpose. As shown, bars 1 and 11 are connected by ring $G'$, 8 and 15 by $G^2$, 6 and 13 by $G^3$, 4 and 10 by $G^4$, 3 and 9 by $G^5$, 7 and 16 by $G^6$, 5 and 14 by $G^7$, and 2 and 12 by $G^8$. The neutral line extends vertically through the center of the armature, while the commutator brushes or springs P N make contact with the sides of the commutator-cylinder at the ends of its horizontal diameter, the bars next to the neutral line being connected with the central side commutator-bars, as shown and previously explained. On the left-hand side of the neutral line the currents in the radial bars, as shown in Fig. 1, all run inwardly, while those on the right-hand side flow outwardly. In the position shown one portion of the current would pass from the negative to the positive commutator-brush, via 1, $G'$, 11, 2, $G^8$, 12, 5, $G^7$, 14, 7, $G^6$, and 16 and the other portion via 8, $G^2$, 15, 6, $G^3$, 13, 4, $G^4$, 10, 3, $G^5$, and 9, the proper plates E and straps H being included in the circuits.

By dividing the disk into radial sections or bars and connecting them, so as to generate a continuous current, a much higher electro-motive force can be obtained than by the use of the simple undivided disk employed by Arago in his experiments.

What I claim is—

1. The armature of a dynamo or magneto electric generator or engine, consisting of a series or number of separate radial disk-sections electrically insulated from each other, but mechanically connected together to form a rigid disk, substantially as set forth.

2. The combination, with an armature of a dynamo or magneto electric generator or engine, formed of a series or number of separate radial disk sections or bars electrically insulated from each other, but mechanically connected to form a rigid disk, of commutator bars and connections, substantially such as described, all the radial disk sections or bars being thereby kept continuously in circuit, substantially as set forth.

3. The combination, in an armature for a dynamo or magneto electric generator or engine, of separate radial disk sections or bars electrically insulated from each other, but mechanically connected together to form a disk, and concentric rings connecting the disk sections or bars in a multiple arc, substantially as set forth.

4. A magneto or dynamo electric machine or electric engine having, in combination, the armature constructed of radial bars connected in pairs at their inner ends with the commutator-bars and suitable connections of different pairs at the outer ends of the radial bars, whereby the radial bars will all be kept continuously in circuit, substantially as set forth.

5. In a dynamo or magneto electric machine or electric engine, the combination, with the armature, of the concentric rings for connecting the armature-bars in multiple arc, revolving outside of the polar extensions of the magnet or magnets, substantially a set forth.

6. In a dynamo or magneto electric machine or electric engine, the combination, with the radial bars, of the concentric rings outside of the radial bars and connections between such bars and rings, substantially as set forth.

This specification signed and witnessed this 3d day of June, 1881.

T. A. EDISON.

Witnesses:
RICHD. N. DYER,
H. W. SEELY.